(12) United States Patent
Thorp

(10) Patent No.: X9778
(45) Date of Patent: Jun. 25, 1836

(54) COOKING STOVE

(76) Inventor: Gould Thorp

Gould Thorp. New York.

Letters Patent.

The Schedule referred to in these Letters Patent
and making part of the same containing a description in the words
of the said Gould Thorp himself of his improvement in the cooking stove.

To all to whom it may concern:
Be it known that I Gould Thorp of the City of New York have
invented certain improvements in the cooking stove for which
Letters Patent of the United States were granted to Philologas
Kelly on the first day of March 1839; and I do hereby declare that
the following is a full and exact description of my said improve=
ment.

I do not think it necessary to describe the said Kelly's stove,
as it is well known and is now public property, and the specification
thereof is in the Patent Office. The improvement which I have made
consists principally in the arrangement of the part for carrying off
the steam; a double sliding damper to open and close certain flues; and
the contracting of the fire place so as to economize fuel. The smoke
pipe I arrange at the back part of the stove immediately over the flue behind
the oven, and I make a steam flue the whole width of the oven part of
the stove, which I generally cause to terminate in the smoke flue, in a
way similar to that adopted by Kelly, or instead of this, a tube or
tubes, may be continued back so as to enter a chimney or otherwise; from
the great length of the throat or opening of this flue in front it secures more
effectually the escape of the steam from the boiler. Stew pans &c imme
diately over the fire. I carry the flues for heated air all around the oven,
as was done by Kelly, the upper flue being below the steam flue above
mentioned, and I make dampers or shutters to close the vertical flues
at front and back. I connect these shutters or dampers by extending rods rods or bars from one to the other so that they may both be acted upon by one common rod, or handle extending through the back or front plate of the oven; by moving this when one of these flues is closed the other is entirely open, or the dampers may be moved so far only as to leave them both partially open, thus affording an opportunity to regulate and direct the draught in any way which may be desired. In order to contract the fire place, and yet allow the fire to act directly and fully upon the bottoms of the boilers immediately over the fire, I bring the lower plate of the oven forward into the fire place, say three or four inches more or less, it then bends down vertically and then again turns horizontally and meets the back plate of the fire place; by increasing or diminishing the step formed by the projection and bending of the lower oven plate as described, the fire place may be contracted in any desired proportion, allowing sufficient depth for the bottoms of the boilers &c. The boiler plate above the fire may have its two openings thrown into one by the division plate between them being made moveable as is done in some other stoves. I also make an opening for a boiler above the oven, by connecting the two plates which constitute the steam flue by means of a rim. What I claim as my improvements upon [illegible]'s Stove, is the constructing of the steam flue in manner above described; the double sliding dampers operating in the manner and for the purpose set forth; and the manner of constructing the fire place by bringing the back plate thereof forward.

Witnesses.

[illegible] } Gould Thorp.

David B. Thorp }

([illegible])

Ex[illegible]

Ch[illegible]

(Patented June 25. 1836.)